July 15, 1941.  F. W. REICHELT  2,249,567
DEVICE FOR STEMMING LEAVES AND FLOWERS
Filed Aug. 25, 1938
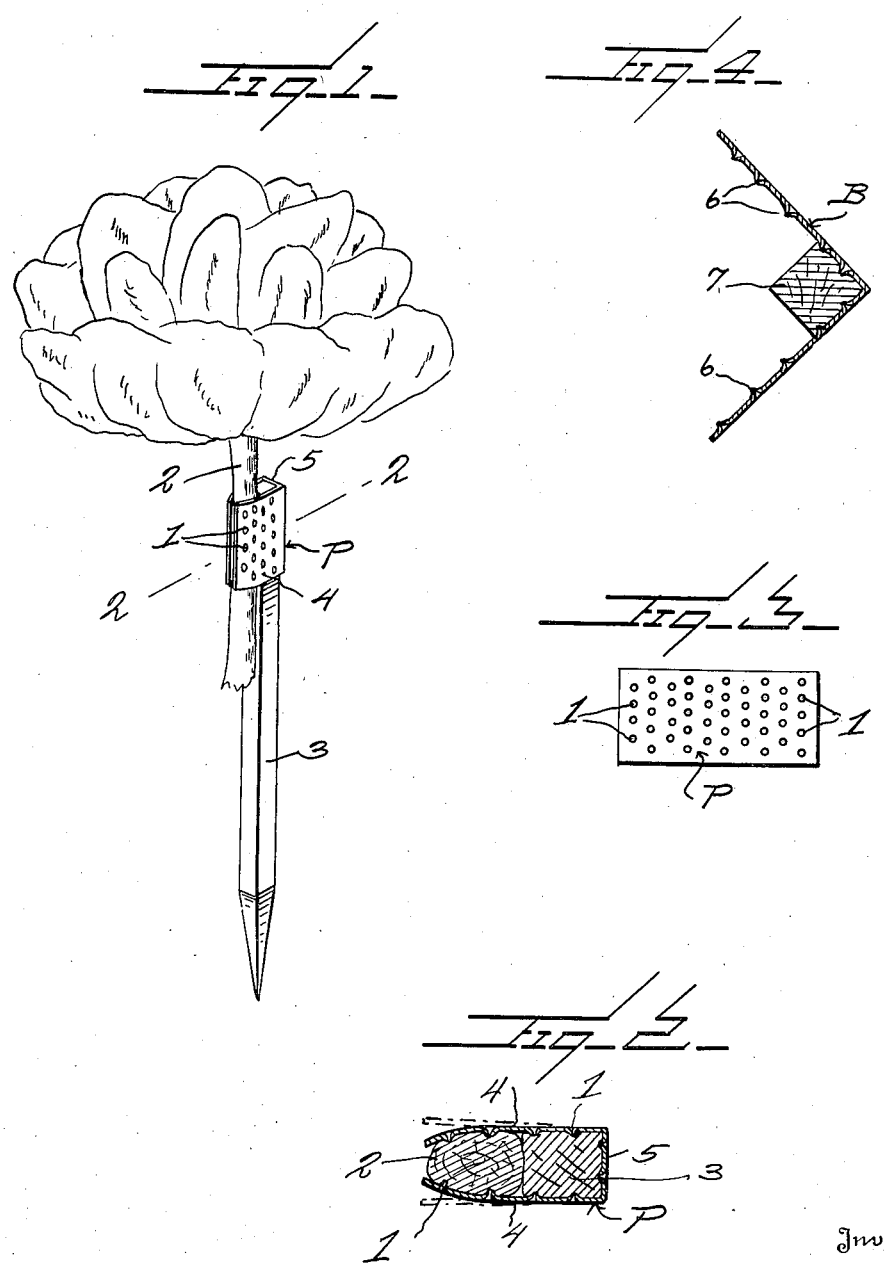

Patented July 15, 1941

2,249,567

UNITED STATES PATENT OFFICE 2,249,567

DEVICE FOR STEMMING LEAVES AND FLOWERS

Frederick William Reichelt, Ansonia, Conn.

Application August 25, 1938, Serial No. 226,830

2 Claims. (Cl. 47—55)

This invention relates to a device for stemming leaves and flowers, and it is a particular object of the invention to provide a device of this kind comprising a strip of perforated metal for clamping a stem of a leaf or flower to a stick of desired length whereby said stem may be lengthened when the occasions of practice so require.

It is also an object of the invention to provide a device of this kind which can be readily applied without the necessity of using any special tools or implements and wherein the device is also of a character to be employed with equal facility with flower stems and sticks of varying sizes.

The invention consists in the details of construction and in the combination and arrangement of the several parts of my improved device for stemming leaves and flowers whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein—

Figure 1 is a view in perspective of a device constructed in accordance with an embodiment of my invention;

Figure 2 is a detailed sectional view taken substantially on the line 2—2 of Figure 1, the initial position of the side arms of the device being indicated by broken lines;

Figure 3 is a view in plan of a blank from which the improved device is formed;

Figure 4 is a sectional view illustrating a device constructed in accordance with another embodiment of my invention.

As disclosed in the accompanying drawing, my improved device comprises a metallic plate P of desired dimensions and which has pressed outwardly therefrom entirely beyond one face the prongs 1. These prongs 1, as particularly illustrated in Figure 3, are arranged in a series of rows substantially equidistantly spaced lengthwise of the plate and disposed transversely thereof with the prongs 1 of one row being staggered with respect to the prongs in the row or rows adjacent thereto. It is to be noted that the prongs 1 of each row are in relatively close proximity to each other and that the prongs 1 of one row are also closely adjacent to the adjacent row or rows of prongs.

This relatively close arrangement of the prongs 1 together with the prongs of one row being staggered with respect to the prongs of an adjacent row are features of decided advantage as an effective gripping of a flower stem is assured irrespective of the size of such stem.

It is the purpose of my improved device to clamp a flower or leaf stem 2 to an elongated supplemental wooden stem 3 and which operation, generally speaking, has been known for quite some time.

The plate P is bent or folded into substantially U-shape with the side arms 4 thereof spaced apart a distance to have close contact with opposed faces of the stick 3 and with the intermediate or base portion 5 of the device in close contact with an adjacent face of the stick 3. The prongs 1 in the portion 5 and in the adjacent portions of the side arms 4 are readily forced by hand pressure within the stick 3, which is of wood, whereby the device is effectively held to the stick 3 and preferably at an end portion of the stick as illustrated in Figure 1.

The side arms 4 are of a length to extend a material distance beyond the face of the stick 3 remote from the face of the stick with which the base portion 5 contacts. These extended portions of the arms 4 receive therebetween the stem 2 of a flower or leaf and upon pressing the outer extremities of the side arms 4 inwardly or one toward the other by finger pressure, the prongs 1 of said outer or extended portions of the side arms 4 will penetrate the stem 2 and effectively hold the same against the stick 3. It is to be stated at this time that the plate P is of a metal which will bend under manual pressure and retain the shape into which it may be bent. It is to be noted that the side faces of the stick 3 are substantially flat and relatively broad.

In Figure 4 of the drawing is illustrated an embodiment of the invention wherein the plate B is substantially V-shaped in form but otherwise constructed in substantially the same manner as the first embodiment of the invention so that the prongs 6 will properly penetrate the stick 7 and the flower stem. In this embodiment of the invention it is also to be noted that the stick 7 has its side faces substantially flat and each of a material width.

From the foregoing description it is thought to be obvious that a device for stemming leaves and flowers constructed in accordance with my invention is particularly well adapted for use by reason of the convenience and facility with which it may be assembled and used, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination, a wooden stick having its side faces substantially flat and each of a material width, a member for clamping the stem of a flower or leaf to one of said flat faces of the stick, said member being of metal and having side arms contacting with other side faces of the stick and extending beyond said faces, said arms being bendable to permit the same to be forced one toward the other to clamp the stem to the stick, the arms of said member having prongs to penetrate the stick and also to penetrate the stem, said prongs being arranged in rows extending across the member, the prongs of one row being staggered with respect to the prongs of an adjacent row, adjacent prongs being in close relation.

2. A device for clamping the stem of a leaf or flower to a stick comprising an elongated flat plate of bendable material formed to provide side arms to receive a portion of the stick between the inner portions of said arms, said side arms being broad and of a length to extend beyond the stick applied therebetween, said extended portions being adapted to receive the stem of a flower or leaf therebetween so that by pressing the outer end portions of the side arms one toward the other the stem will be effectively clamped to the stick, said side arms having inwardly disposed prongs over their entire areas to penetrate both the stick and the stem, said prongs being arranged in rows disposed across the plate with the prongs of one row staggered with respect to the prongs of the second row, adjacent prongs being in close proximity.

FREDERICK W. REICHELT.